(12) United States Patent
Galeazzi et al.

(10) Patent No.: US 10,288,189 B2
(45) Date of Patent: May 14, 2019

(54) PNEUMATIC CONTROLLER

(71) Applicant: Acorn Engineering Company, City of Industry, CA (US)

(72) Inventors: Carlos J. Galeazzi, Rancho Cucamonga, CA (US); Thomas Kent Zinn, Chino Hills, CA (US); Ronald T. Hahn, Yorba Linda, CA (US)

(73) Assignee: Acorn Engineering Company, City of Industry, CA (US)

( * ) Notice: Subject to any disclaimer, the term of this patent is extended or adjusted under 35 U.S.C. 154(b) by 0 days.

(21) Appl. No.: 15/698,116

(22) Filed: Sep. 7, 2017

(65) Prior Publication Data

US 2019/0072204 A1    Mar. 7, 2019

(51) Int. Cl.
| | |
|---|---|
| *F16K 31/126* | (2006.01) |
| *G05D 7/01* | (2006.01) |
| *F16K 7/17* | (2006.01) |
| *F16K 1/12* | (2006.01) |

(52) U.S. Cl.
CPC .......... *F16K 31/1262* (2013.01); *F16K 1/126* (2013.01); *F16K 7/17* (2013.01); *G05D 7/012* (2013.01)

(58) Field of Classification Search
CPC ........ F16K 31/1262; F16K 1/126; F16K 7/17; G05D 7/012; Y10S 137/907
See application file for complete search history.

(56) References Cited

U.S. PATENT DOCUMENTS

| | | | |
|---|---|---|---|
| 1,370,760 A | 3/1921 | Ostrander | |
| 4,373,838 A | 2/1983 | Foreman et al. | |
| 5,634,494 A * | 6/1997 | Martens | E03F 1/006 137/205 |
| 5,657,784 A * | 8/1997 | Martens | E03F 1/006 137/12 |
| 6,311,718 B1 | 11/2001 | Hafner et al. | |
| 9,068,670 B2 | 6/2015 | Dickins et al. | |
| 2015/0346734 A1 | 12/2015 | Blocher et al. | |
| 2017/0030476 A1 | 2/2017 | Taya et al. | |

FOREIGN PATENT DOCUMENTS

DE            2838788       12/1981

* cited by examiner

*Primary Examiner* — Matthew W Jellett
(74) *Attorney, Agent, or Firm* — Eric J. Sosenko; Jonathan P. O'Brien; Honigman LLP

(57) ABSTRACT

A pneumatic controller for connecting to a vacuum source and providing a vacuum output signal. The pneumatic controller includes a valve body defining a number of different chambers. At least two of the chambers that are separated by diaphragm and one of these chambers is maintained at vacuum pressure. In response to a pressure differential between the two chambers, the diaphragm deforms causing a valve to move from a first position, where an output port is coupled to atmospheric pressure, to a second position, where the output port is coupled to vacuum pressure. The valve is inhibited for moving between the first and second positions unless a sufficient vacuum pressure is present. Movement of the valve from the second position to the first position is also delayed until the two chambers are substantially equalized.

18 Claims, 3 Drawing Sheets

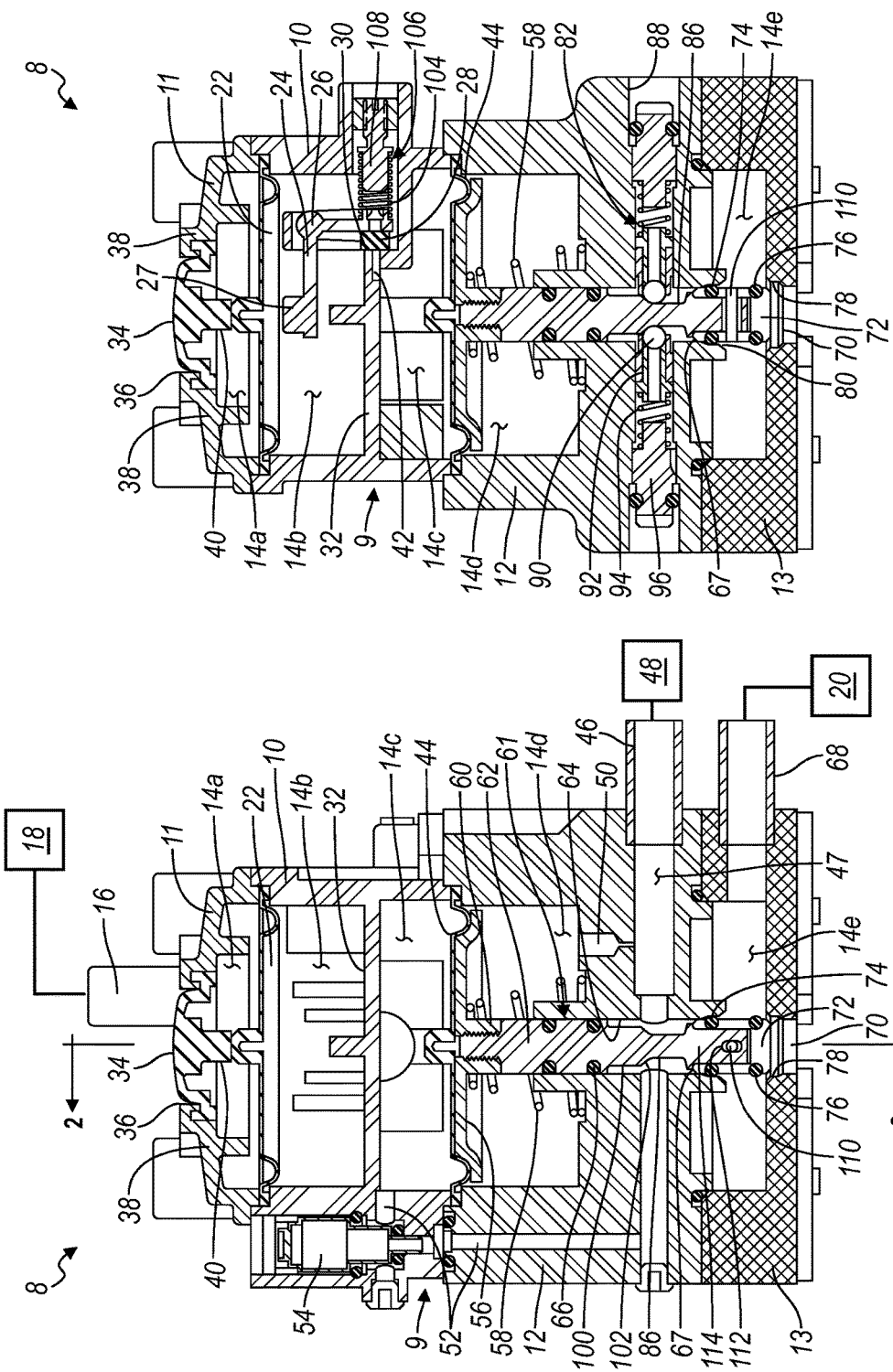

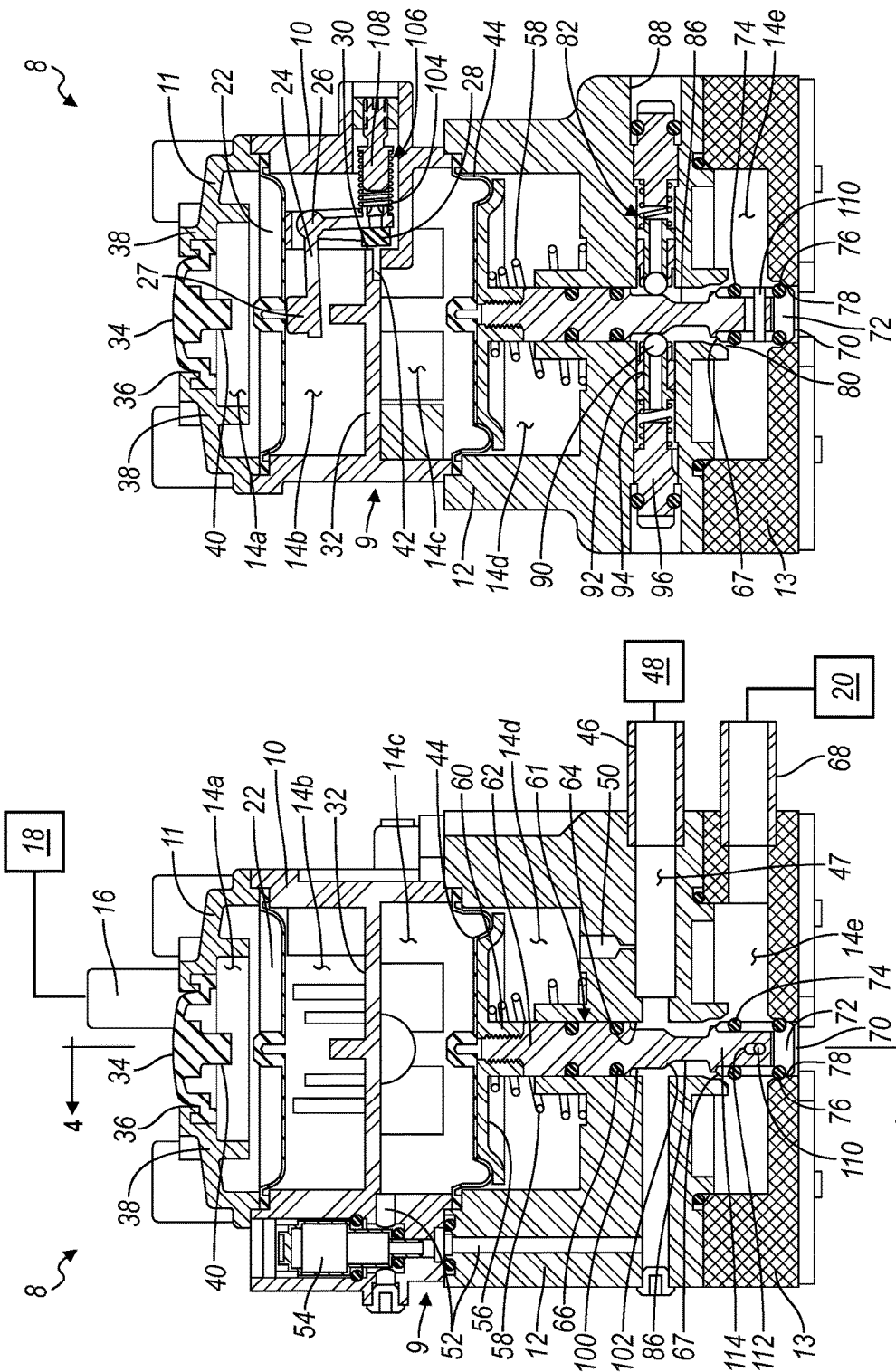

PNEUMATIC CONTROLLER

BACKGROUND

1. Field of the Invention

The present invention generally relates to pneumatic controllers. More specifically, the invention relates to a pneumatic controller that provides a timed vacuum at an output port in response to a received control signal.

2. Description of Related Art

Pneumatic controllers are used in a variety of applications to control a wide variety of devices. Often, pneumatic controllers are used to control valves, causing the valves to open and close in response to the state of the pneumatic controller. One application of such pneumatic controllers and a fluid transport system, such as a vacuum sewage system.

Typically, the pneumatic controller includes a diaphragm in the middle of a chamber that moves when vacuum on one side the diaphragm is released. By releasing the vacuum on one side the diaphragm, pressure on that side the diaphragm is increased. Movement of the diaphragm is in turn permits a vacuum to be drawn on a control port that is connected to the device to be controlled. The applied vacuum to the controlled device operates to activate the device until the applied vacuum is relieved.

SUMMARY

A pneumatic controller is provided for connecting to a vacuum source and providing a temporary vacuum output signal to a controlled device in response to an input signal.

In an aspect of the invention, the pneumatic controller includes a valve body having a vacuum port, a control port and a vent port; a differential chamber located within the valve body, the differential chamber being segregated by a diaphragm into first and second chambers, the first chamber being selectively coupled to atmospheric pressure and to the vacuum port, the second chamber being in communication with the vacuum port; a control chamber located with the valve body, the control chamber being in communication with the control port and also being coupled to the vacuum port by an isolation port; a valve moveably connected to the diaphragm and being moveable between sealed engagement with the isolation port and sealed engagement with the vent port, during sealed engagement of the valve with the isolation port the control chamber being configured to communicate atmospheric pressure from the vent port to the control port, during sealed engagement of the valve with the vent port the control chamber being configured to communicate vacuum pressure from the vacuum port to the control port through the isolation port; and a force applying member in biased engagement with the valve, the force applying member configured to exert a predetermined force on the valve and permit movement of the valve from sealed engagement with the isolation port to sealed engagement with the vent port only upon a predetermined pressure differential being established between atmospheric pressure in the first chamber and vacuum pressure in the second chamber.

In another aspect, an adjustment feature cooperates with the force applying member and is configured to provide the predetermined force as an adjustable predetermined force.

In a further aspect, the force applying member and the adjustment feature are all components of a detent.

In still another aspect, the detent is a ball detent.

In an additional aspect, the force applying member is a ball bearing and the biasing member is a spring.

In yet a further aspect, the valve includes a valve stem having a reduced diameter portion, and the force applying member engages the reduced diameter portion when the valve is in sealing engagement with the isolation port.

In yet another aspect, the valve stem includes a larger diameter portion adjacent to the reduced diameter portion, and the force applying member engages the larger diameter portion when the valve is in sealing engagement with the vent port.

In still a further aspect, the valve includes spaced apart upper and lower seals, the upper seal being configured to engage the isolation port and the lower seal being configured to engage the vent port.

In an additional aspect, the valve includes a sealing member moveably connected to a valve stem and which is moveable between a first position and a second position relative to the valve stem.

In another aspect, the pneumatic controller includes third and fourth chambers located within the valve body, the fourth chamber being segregated from the third chamber by a sensor diaphragm and being selectively coupled by a second valve to the first chamber to provide atmospheric pressure to the first chamber upon increased pressure in the third chamber.

In a further aspect, the third chamber is coupled to a sensor port that is configured to receive and communicate increased pressure to the third chamber.

In an aspect of the invention, a pneumatic controller is provided for connecting to a vacuum source and providing a temporary vacuum output signal to a controlled device in response to an input signal, the pneumatic controller including a valve body having a vacuum port, a control port and a vent port; a differential chamber located within the valve body, the differential chamber being segregated by a diaphragm into first and second chambers, the first chamber being selectively coupled to atmospheric pressure and to the vacuum port, the second chamber being in communication with the vacuum port; a control chamber located with the valve body, the control chamber being in communication with the control port and also being coupled to the vacuum port by an isolation port; and a valve moveably connected to the diaphragm and being moveable between sealed engagement with the isolation port and sealed engagement with the vent port, during sealed engagement of the valve with the isolation port the control chamber being configured to communicate atmospheric pressure from the vent port to the control port, during sealed engagement of the valve with the vent port the control chamber being configured to communicate vacuum pressure from the vacuum port to the control port through the isolation port, the valve including a valve stem and a sealing member, the sealing member being axially moveable relative to the valve stem between a first axial position and a second axial position.

In a further aspect, the sealing member is axially movable along the valve stem between the first and second positions.

In still another aspect, in the first position the valve stem and sealing member define an overall length that is shorter than an overall length defined by the valve stem and sealing member when in the second position.

In an additional aspect, the sealing member is in sliding engagement with the valve stem.

In yet a further aspect, the sealing member is movably connected to the valve stem and a distal end of the valve stem.

In still an additional aspect, the sealing member is movably connected to the valve stem by a pin.

In another aspect, the pin is received within a slot.

In still a further aspect, the slot is defined in the valve stem and the pin extends from the sealing member through the slot.

In an additional aspect, the sealing member encircles the valve stem.

In a further aspect, the valve includes spaced apart first and second seals extending circumferentially about the sealing member at the opposing ends thereof.

In an additional aspect, a force applying member is in biased engagement with the valve stem, and wherein the force applying member exerts a predetermined force on the valve stem and permits movement of the valve stem and corresponding movement of the sealing member from sealing engagement with the isolation port to sealing engagement with the vent port only upon a predetermined pressure differential being established between the first chamber and the second chamber.

Further objects, features and advantages of this invention will become readily apparent to persons skilled in the art after review of the following description with reference to the drawings and the claims that are appended to inform a part of this specification.

BRIEF DESCRIPTION OF THE DRAWINGS

FIG. 1 is a cross-sectional view of a pneumatic controller, embodying the principles of the present invention, in an inactive state;

FIG. 2 is a cross-sectional view of the pneumatic controller seen in FIG. 1, generally taken along line 2-2;

FIG. 3 is a cross-sectional view of the pneumatic controller of FIG. 1 in the active state;

FIG. 4 is a cross-sectional view of the pneumatic controller seen in FIG. 3, generally taken along line 4-4;

DETAILED DESCRIPTION

Figure 6:
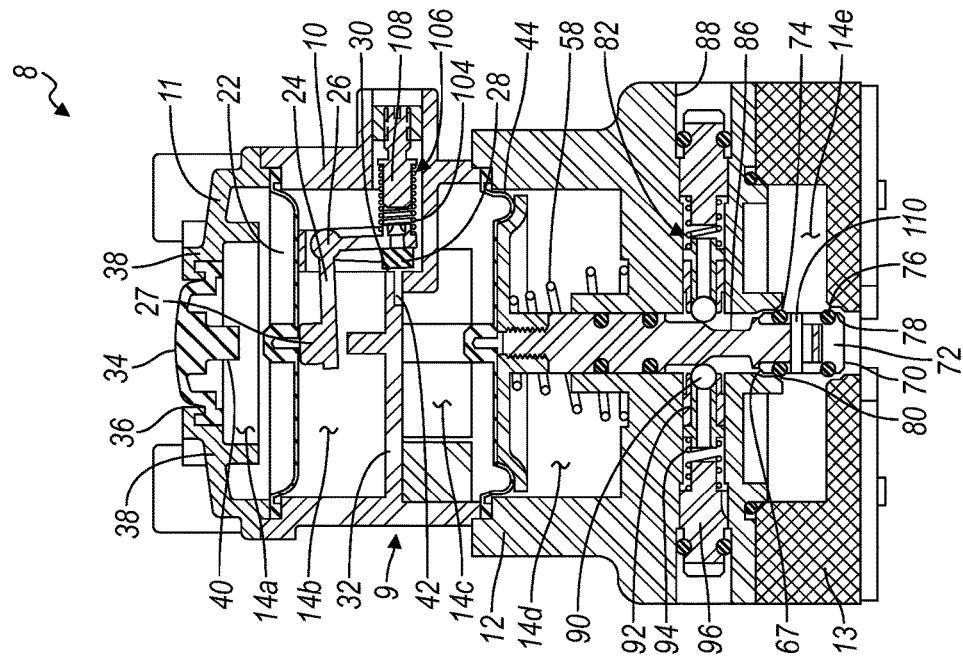
FIG. 6 is a cross-sectional view of the pneumatic controller seen in FIG. 5, generally taken along line 6-6.

As used in the description that follows, directional and/or relative terms such as "upper" and "lower" are used with reference to the orientation of the elements as presented in the figures. Accordingly, "upper" indicates a direction toward the top of the figure and "lower" indicates a direction toward the bottom of the figure. The terms "left" and "right" are similarly interpreted. The terms "inward" or "inner" and "outward" or "outer" indicate a direction that is generally toward or away from a central axis of the referred to part, whether or not such an axis is designated in the figures. An axial surface is one that faces in the axial direction. In other words, an axial surface faces in a direction along the central axis. A radial surface therefore faces radially, generally away from or toward the central axis. It will be understood, however, that in actual implementation, the directional references used herein may not necessarily correspond with the installation and orientation of the corresponding components or device.

Referring now to the drawings, a pneumatic controller embodying the principles of the present invention is generally illustrated in FIG. 1 and designated at 8. The pneumatic controller 8 includes a body 9 that defines a series of chambers. More specifically, the body 9 is comprised of an upper housing 10, an upper cover 11, a lower housing 12 and a lower cover 13, which cooperate, as discussed below, to define a sensing chamber 14a, an atmospheric chamber 14b, a timing chamber 14c, a vacuum chamber 14d and a control chamber 14e. While illustrated and described with reference to five chambers, it will be appreciated that the principles of the present invention may be applied to a pneumatic controller having a lesser or greater number of chambers.

Figure 5:
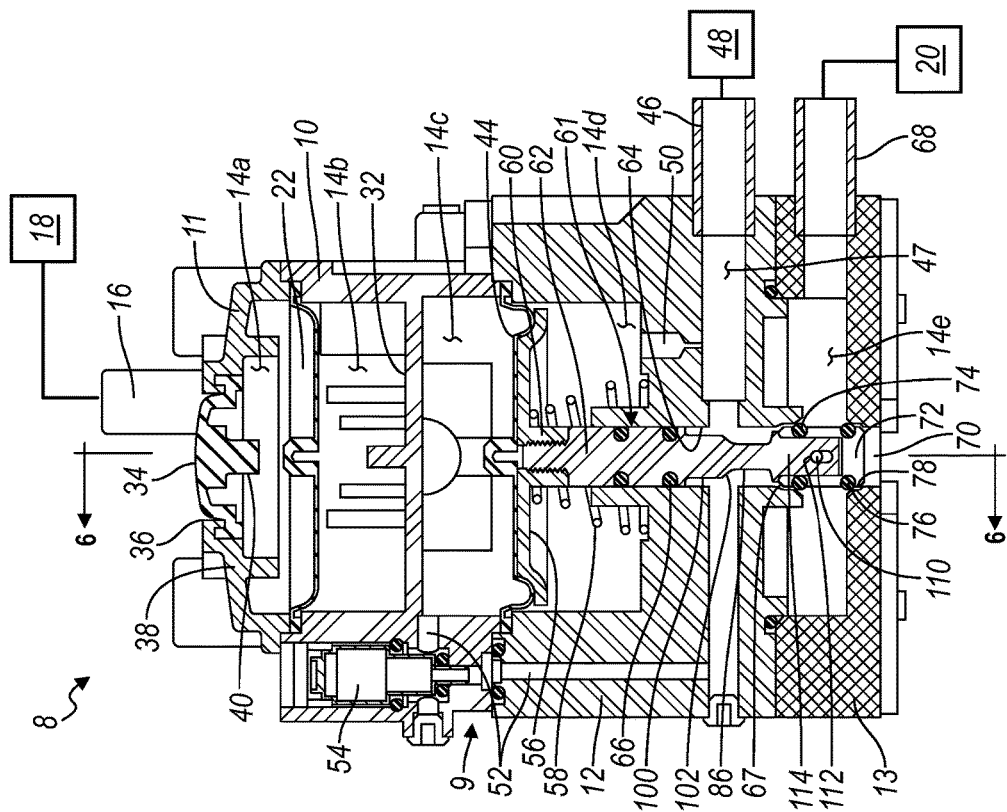
FIG. 5 is a cross-sectional view of the pneumatic controller in transition from the active state of FIG. 3 back to the inactive state of FIG. 1.

As discussed herein, the pneumatic controller 8 has two principal states, an inactive state and an active state. In the inactive state, the pneumatic controller 8 does not provide a vacuum control signal to the controlled device 20. Rather, the atmospheric pressure is provided to the controlled device 20 via the pneumatic controller 8. Conversely, in the active state, the pneumatic controller 8 does provide a vacuum control signal to the controlled device 20 and seals off the controlled device's signal input from atmospheric pressure. In the discussion that follows, FIGS. 1 and 2 illustrate the pneumatic controller 8 in the inactive state; FIGS. 3 and 4 illustrate the pneumatic controller 8 in the active state; and FIGS. 5 and 6 illustrate the pneumatic controller 8 returning from the active state back to the inactive state.

As seen in FIG. 1, the uppermost chamber of the pneumatic controller 8, sensing chamber 14a, is defined in part by the upper cover 11 and is coupled by a sensor port 16 to an input signal source 18, such as a standpipe in a wastewater discharge system (not shown). Thus, the sensing chamber 14a is always at the same pressure as the input signal source 18. In the inactive state of the pneumatic controller 8, the input signal source 18 and the sensing chamber 14a are at atmospheric pressure.

The sensing chamber 14a is separated from the atmospheric chamber 14b by a sensor diaphragm 22, which is supported at its perimeter between the upper housing 10 and upper cover 11. As its name implies, the atmospheric chamber 14b is also at atmospheric pressure when the pneumatic controller 8 is in the inactive state.

The atmospheric chamber 14b is thus defined in part by the upper housing 10 and generally separated from the timing chamber 14c (also defined by the upper housing 10) by a transverse wall 32 of the upper housing 10. However, a control port 42 (see FIG. 2) forms a passageway through the transverse wall 32, from the atmospheric chamber 14b to the timing chamber 14c, and defines a control seat 30 at one end thereof. Located within the atmospheric chamber 14b is a control arm 24 (see FIG. 2). The control arm 24 is pivotally mounted at 26 and includes one end 27 located adjacent to the sensor diaphragm 22 and a control seal 28 supported on an opposing end. In the inactive state, the control arm 24 is biased so that the control seal 28 is in sealed engagement with the control seal 30.

The timing chamber 14c is separated from the vacuum chamber 14d, defined by the lower housing 12, by a vacuum chamber diaphragm 44. Similar to the sensor diaphragm 22, the vacuum chamber diaphragm 44 is supported about its perimeter between the upper housing 10 and the lower housing 12. As further described below, collectively the timing chamber 14c and vacuum chamber 14d compose or make up a differential chamber that is capable of sensing a pressure differential between the two chambers and switching the pneumatic controller 8 from an inactive state to an active state.

In the inactive state, both the timing chamber 14c and vacuum chamber 14d are in a state of vacuum. This vacuum originates from a vacuum source 48 and is drawn throughout the pneumatic controller 8 by way of a vacuum port 46 and a vacuum distribution channel 47, the latter of which is defined in the lower housing 12. The vacuum distribution channel 47 communicates with the vacuum chamber 14d through an equalization port 50 formed in the lower housing 12. Through the equalization port 50, the pressure of the vacuum chamber 14d is always equal to the vacuum pressure in the vacuum distribution channel 47. The vacuum distribution channel 47 also communicates with the timing chamber 14c through a timing port 52, which is formed partially in the lower housing 12 and partially in the upper housing 10. Located within the timing port 52 is an adjustable timing needle or orifice 54. As further discussed below, the timing orifice 54 provides an adjustable time-to-close for the pneumatic controller 8.

A diaphragm plate 56 is located in the vacuum chamber 14d and is biased in the direction of the timing chamber 14c by a spring 58, also provided in the vacuum chamber 14d. The spring 58 therefore acts in a direction against deflection of the vacuum chamber diaphragm 44 toward the vacuum chamber 14d and seeks to establish equilibrium between the pressures of the timing chamber 14c and the vacuum chamber 14d.

Formed on a lower side of the diaphragm plate 56 is a threaded boss 60, and threadably mounted to the boss 60 is a valve 61. The valve 61 itself is comprised of a valve stem 62 and a shuttle 72, with the valve stem 62 engaging the boss 60 at one end and the shuttle 72 at the other end. Preferably, the valve stem 62 is a round shaft that is slideably received within a bore 64 extending through a portion of the lower housing 12. The providing of the valve stem 62 within the bore 64 at this portion is such that the communicating of fluid between the valve stem 62 and the bore 64 is prevented while still permitting sliding movement. For this purpose, one or more seals 66, such as O-rings, may be provided within grooves along the valve stem 62. Alternatively, the seals may be provided and supported within grooves provided in the bore 64 of the lower housing 12.

Further along, the bore 64 intersects with the vacuum distribution channel 47. At this intersection, the valve stem 62 is provided with a reduced diameter 86 (a diameter that is less than the diameter of the bore 64), which assists in allowing vacuum to be communicated about the valve stem 62 and between the valve stem 62 and the bore 64.

After the vacuum distribution channel 47, the bore 64 extends through a portion of the housing 12 and terminates at a vacuum isolation port 67 (hereafter "isolation port 67") communicating with the control chamber 14e. In the inactive state, the control chamber 14e is also at atmospheric pressure. This pressure is provided to the control chamber 14e via a vent port 70 that extends to the exterior of the pneumatic controller 8. The control chamber 14e is also in communication with the controlled device 20 through a control port 68. Accordingly, in the inactive state, atmospheric pressure is communicated to the controlled device 20 through the control chamber 14e.

Generally, the valve stem 62 extends through the intersection of the bore 64 and the vacuum distribution channel 47, through the isolation port 67 and into the control chamber 14e, terminating adjacent to a vent port 70.

As noted above, the shuttle 72 operates in conjunction with the valve stem 62, The shuttle 72 forms the sealing member of the valve 61. For this sealing function, the shuttle 72 is provided with a pair seals on its outer periphery, preferably one toward each of the shuttle's opposing ends. As seen in the figures, an upper seal 74 is provided on the upper end of the shuttle 72 and a lower seal 76 is provided on a lower end of the shuttle. The seals 74, 76 may be provided through a variety of implementations. One such preferred implementation is to provide the seals as O-rings within grooves in the outer periphery of the shuttle 72. The upper seal 74 is adapted to engage an isolation seat 80, generally provided at the isolation port 67 in the control chamber 14e. The lower seal 76 is adapted to engage a vent seat 78, generally provided at an interior termination of the vent port 70 in the control chamber 14e. Alternatively, the seals and seats may be reversed, with the seals being supported in the isolation and vent ports 67, 70 and the corresponding seats being defined on the shuttle 72.

When the sensing chamber 14a is exposed pressure greater than atmospheric pressure, the sensor diaphragm 22 deforms in response to the increased pressure and is deflected downward, generally in the direction of the atmospheric chamber 14b, as seen in FIG. 3. This downward deflection causes the sensor diaphragm 22 to engage the end 27 of a control arm 24, causing the control arm 24 to pivot about the mounting 26. As seen in FIG. 4, movement of the control arm 24 in turn causes the control seal 28, supported on the opposing end of the control arm 24, to be lifted from the control seat 30. With the control seal 28 lifted from the control seat 30, the timing chamber 14c is brought into communication with the atmospheric chamber 14b, and air at a pressure higher than vacuum (i.e. atmospheric pressure) is then allowed to enter into the timing chamber 14c through the control port 42.

The increased the pressure within the timing chamber 14c overcomes the biasing force of the spring 58 and causes downward deflection of the vacuum chamber diaphragm 44, as well as downward movement of the diaphragm plate 56 and the valve 61. Upon sufficient downward movement of the valve 61, or more specifically the valve stem 62, the upper seal 74 is caused to disengage from the isolation seat 80. At this point the vacuum distribution channel 47 is in communication with the control chamber 14e. Further downward movement of the valve stem 62 causes the lower seal 76 to engage with the vent seat 78, thereby establishing direct communication between the vacuum distribution channel 47 and the control chamber 14e, while closing off the control chamber 14e from the vent port 70. With the vent port 70 closed off, vacuum is drawn through the control port 68 and provided as a vacuum control signal to the controlled device 20, thereby activating the controlled device 20, which may be a discharge valve of a wastewater discharge system.

Optionally, activation of the pneumatic controller 8 may be performed manually instead of through increased pressure provided from the input signal source 18 to the sensor port 16. To provide for manual activation, a bellow 34 defines part of the sensing chamber 14a and is provided in an aperture 36 in an upper wall 38 of the upper cover 11. Manually depressing the bellow 34 causes a boss 40, provided on the interior of the bellow 34, to engage and deflect the sensor diaphragm 22. The deflected sensor diaphragm 22 is brought into contact with the upper end 27 of the control arm 24, thereby pivoting the control arm 24 and lifting the control seal 28 from the control seat 30. Thereafter, the pneumatic controller 8 operates as discussed above.

The pneumatic controller 8 is further provided with a minimum activation pressure control feature. This feature prevents the above sequence of operation from occurring if the vacuum pressure supplied to the pneumatic controller 8 is insufficient to operate the controlled device 20. As provided herein, the minimum activation pressure control feature incorporates a pair of opposed detents 82 and a corresponding reduced diameter portion 86 formed on the valve stem 62.

As seen in FIGS. 1 and 2, in its inactive state, prior to operation, the spring 58 biases the diaphragm plate 56 and the valve stem 62 in an upward direction and equilibrium is established between the timing chamber 14c and the vacuum chamber 14d. As atmospheric pressure is introduced into the timing chamber 14c, resulting from lifting of the control seal 28 off of the control seat 30, atmospheric pressure exerts a downward force on the vacuum chamber diaphragm 44, which results in a downward force also being applied to the valve stem 62. The magnitude of this downward force is dependent upon the amount of pressure being applied to the timing chamber 14c. The greater the vacuum pressure applied to the pneumatic controller 8, and therefore the pressure differential between the timing chamber 14c and the vacuum chamber 14d, the greater the downward force applied to the valve stem 62 will be.

The minimum activation pressure control feature is adjustable to ensure that the pneumatic controller 8 will not switch from the inactive state to the active state unless the vacuum pressure applied to the pneumatic controller 8 is sufficient to operate the control device 20. To achieve this, the detents 82 apply a force against the valve stem 62 that will only be overcome if sufficient vacuum pressure is presented to and exists in the pneumatic controller 8. More specifically, a detent 82 is provided in each of two opposing bores 88 and the detents 82 press into engagement with the exterior surface of the valve stem 62. The detents 82 are preferably ball spring detents and include ball bearings 90 supported by a ball sleeve 92 and urged by a ball spring 94 against the surface of the valve stem 62. A detent screw 96 is threadably engaged within the bore 88. By adjusting the position of the detent screw 96 relative to the bore 88, the amount of force exerted by the ball bearing 90 against the valve stem 62 can be controlled and adjusted.

In the inactive state, when atmospheric pressure is being communicated to the control device 20, the ball bearings 90 of the detents 82 are received within the reduced diameter portion 86 of the valve stem 62. As the vacuum chamber diaphragm 44 is urged downward by atmospheric pressure in the timing chamber 14c, the amount of downward force generated is dependent upon the differential pressure between the timing chamber 14c and the vacuum chamber 14d. In order for the pneumatic controller 8 to move into the active state, the generated downward force must be sufficient to overcome the force applied by the detents 82 and to move the ball bearings 88 out of the reduced diameter portion 86 and onto an adjacent, larger diameter portion 100 of the valve stem 62. The slope and nature of the transition 102 between the reduced diameter portion 86 and the adjacent, larger diameter portion 100 of the valve stem 62 can also be varied to affect the amount of force required for this movement. Obviously, the amount of force exerted by the detents 82 and the nature of the transition 102 between the reduced diameter portion 86 and the adjacent larger diameter portion 100 are selected such that the pneumatic controller 8 is only permitted to move from the inactive state to the active state when sufficient vacuum pressure is present in the pneumatic controller 8 to operate the controlled device 20.

When sufficient vacuum pressure is present and atmospheric pressure is introduced into the timing chamber 14c, the downward force exerted on the valve stem 62 is sufficient to overcome the detents 82 and move the shuttle 72 downward, disengaging the upper seal 74 from the isolation seat 80 and causing engagement of the lower seal 76 with the vent seat 78, as seen in FIGS. 3 and 4. At this point, a vacuum is drawn by the vacuum distribution channel 47 through the control chamber 14e and the vacuum pressure is applied to the controlled device 20.

Referring now to FIGS. 5 and 6, when the sensing chamber 14a returns to atmospheric pressure, the sensor diaphragm 22 returns to its non-deformed position and disengages from the end 27 of the control arm 24. With the diaphragm 22 disengaged from the control arm 24, the control arm 24 is free to return to its initial, inactive state and the control seal 28 reengages the control seat 30. This may be achieved by way of a biasing member 104, such as a spring, acting on the opposing end of the control arm 24 so as to bias the control seal 28 into engagement with the control seat 30. The spring 104 may be provided as part of a sensor adjustment assembly 106 having a body 108 threadably engaged with the housing 12. By threadably adjusting the position of the body 108, and therefore the force of the spring 104 on the control arm 24, the sensor adjustment assembly 106 can be used to control the pressure at which the pneumatic controller 8 is initially activated.

With the control seal 28 re-engaged with the control seat 30, the timing chamber 14c is once again isolated from the atmosphere chamber 14b. At this point, the vacuum within the timing port 52 draws atmospheric pressure out of the timing chamber 14c by way of the vacuum distribution channel 47. The rate at which vacuum pressure is reestablished in the timing chamber 14c is regulated by the timing needle 54. Since timing needles are well known devices, further details regarding the construction and operation of the timing needle 54 are not provided herein. As seen in the discussion which follows, the timing needle 54 therefore controls the time it takes to deactivate the pneumatic controller 8 and the controlled device 20.

As previously noted, the vacuum chamber 14d is continuously held at vacuum pressure via the equalization port 50 connecting the vacuum chamber 14d to the vacuum distribution channel 47. As the pressure in the timing chamber 14c returns the vacuum and equalizes with the vacuum chamber 14d, the spring 58 overcomes the pressure differential between timing chamber 14c and the vacuum chamber 14d and begins to move the vacuum chamber diaphragm 44 and the diaphragm plate 56 upward, retracting the valve stem 62. Eventually, the valve stem 62 is completely retracted and the lower seal 76 of the shuttle 72 has disengage the vent seat 78 and the upper seal 74 has reengaged the isolation seat 80. With the upper seal 74 of the shuttle 72 reengaged with the isolation seat 80, the control chamber 14e and the controlled device 20 are sealed off from the vacuum distribution channel 47 and are returned to atmospheric pressure by the opening of the vent port 70.

The shuttle 72 and the valve stem 62 are engaged in a manner that allows the valve stem 62 to be almost completely retracted before the shuttle 72 disengages from the vent port 70. In this manner, the shuttle 72 is caused to quickly switch from the active position (being engaged with the vent seat 78 of the vent port 70) to the inactive position (being engaged with the isolation seat 80). By quickly switching from the active position to the inactive position, the shuttle 72 limits bleeding off of the vacuum pressure during the timing phase, which could otherwise occur about the valve stem 62 from the vacuum distribution channel 47 and the valve control chamber 14e. Accordingly, this allows the controlled device 20 to be deactivated quickly and vacuum pressure to be preserved within the pneumatic controller 8 and the whole vacuum distribution system.

To achieve the above, the shuttle 72 is engaged with the valve stem 62 by way of a slot and pin construction. More specifically, a pin 110 diametrically extends through the shuttle 72 and is fixed relative to the shuttle 72. The pin 110 also extends through a slot 112 defined in the distal end 114 of the valve stem 62. The length of the slot 112 is aligned with the longitudinal axis of the valve stem 62 and the pin 110 is freely movable within the slot 112 between the ends of the slot 112. Accordingly, the length of the slot 112 is provided so that the pin 110 does not engage the upper end of the slot 112 (the end located toward the isolation port 80 until the valve stem 62 is almost fully retracted. In this way, the valve stem 62 does not pull on the shuttle 72, causing it to move from the active position to the inactive position, until immediately before the valve stem 62 is fully retracted. During retraction, the valve stem 62 is initially moved upward and the pin 110 slides within the slot 112. Once the pin 110 engages the uppermost end of the slot 112, the pin 110, by way of the valve stem 62, initiates and causes movement of the shuttle 72 from its active position to its inactive position. Correspondingly, during movement of the shuttle 72 from the inactive position to the active position, the pin 110 engages with the lower end of the slot 112.

With the pneumatic controller 8 returned to its inactive state, the process may be repeated and the controlled device 20 activated as necessary.

As a person skilled in the art will really appreciate, the above description is meant as an illustration of at least one implementation of the principles of the present invention. This description is not intended to limit the scope or application of this invention since the invention is susceptible to modification, variation and change without departing from the spirit of this invention, as defined in the following claims.

We claim:

1. A pneumatic controller for connecting to a vacuum source and providing a temporary vacuum output signal to a controlled device in response to an input signal, the pneumatic controller comprising:
   a valve body, the valve body including a vacuum port, a control port and a vent port;
   a differential chamber located within the valve body, the differential chamber being segregated by a diaphragm into first and second chambers, the first chamber being selectively coupled to atmospheric pressure and to the vacuum port, the second chamber being in communication with the vacuum port;
   a control chamber located with the valve body, the control chamber being in communication with the control port and also being coupled to the vacuum port by an isolation port; and
   a valve moveably connected to the diaphragm and being moveable between sealed engagement with the isolation port and sealed engagement with the vent port, during sealed engagement of the valve with the isolation port the control chamber being configured to communicate atmospheric pressure from the vent port to the control port, during sealed engagement of the valve with the vent port the control chamber being configured to communicate vacuum pressure from the vacuum port to the control port through the isolation port, the valve including a valve stem and a sealing member, the sealing member being axially moveable relative to the valve stem between a first axial position and a second axial position while remaining in sealed engagement with the isolation port and while remaining in sealed engagement with the vent port, the sealing member also including spaced apart first and second seals extending circumferentially about the sealing member at opposite ends thereof.

2. The pneumatic controller according to claim 1, wherein in the first axial position the valve stem and the sealing member define an overall length that is shorter than an overall length defined by the valve stem and the sealing member when in the second axial position.

3. The pneumatic controller according to claim 1, wherein the sealing member is in sliding engagement with the valve stem.

4. The pneumatic controller according to claim 1, wherein the sealing member is movably connected to the valve stem at a distal end of the valve stem.

5. The pneumatic controller according to claim 1, wherein the sealing member is movably connected to the valve stem by a pin.

6. The pneumatic controller according to claim 5, wherein the pin is received within a slot.

7. The pneumatic controller according to claim 6, wherein the slot is defined in the valve stem and the pin extends from the sealing member through the slot.

8. The pneumatic controller according to claim 1, wherein the sealing member encircles the valve stem.

9. The pneumatic controller of claim 1, further comprising a force applying member in biased engagement with the valve, and wherein the force applying member exerts a predetermined force on the valve and permits movement of the valve from sealed engagement with the isolation port to sealed engagement with the vent port only upon a predetermined pressure differential being established between atmospheric pressure in the first chamber and vacuum pressure the second chamber.

10. A pneumatic controller for connecting to a vacuum source and providing a temporary vacuum output signal to a controlled device in response to an input signal, the pneumatic controller comprising:
   a valve body, the valve body including a vacuum port, a control port and a vent port;
   a differential chamber located within the valve body, the differential chamber being segregated by a diaphragm into first and second chambers, the first chamber being selectively coupled to atmospheric pressure and to the vacuum port, the second chamber being in communication with the vacuum port;
   a control chamber located with the valve body, the control chamber being in communication with the control port and also being coupled to the vacuum port by an isolation port;
   a valve moveably connected to the diaphragm and being moveable between sealed engagement with the isolation port and sealed engagement with the vent port, during sealed engagement of the valve with the isolation port the control chamber being configured to communicate atmospheric pressure from the vent port to the control port, during sealed engagement of the valve with the vent port the control chamber being configured to communicate vacuum pressure from the vacuum port to the control port through the isolation port, the valve including a valve stem and a sealing member, the sealing member being moveably connected to the valve stem and moveable between first and second positions relative to the valve stem and respectively engaging the isolation port and the vent port, the sealing member including axially spaced apart first and second seals, the first seal being configured to engage the isolation port and the second seal being configured to engage the vent port; and
   a force applying member in biased engagement with the valve, the force applying member configured to exert a predetermined force on the valve and permit movement of the valve from sealed engagement with the isolation port to sealed engagement with the vent port only upon a predetermined pressure differential being established between atmospheric pressure in the first chamber and vacuum pressure in the second chamber.

11. The pneumatic controller of claim 10, further comprising an adjustment feature cooperating with the force applying member, the adjustment feature configured to provide the predetermined force as an adjustable predetermined force.

12. The pneumatic controller of claim 1, wherein the force applying member and the adjustment feature are components of a detent.

13. The pneumatic controller of claim 12, wherein the detent is a ball detent.

14. The pneumatic controller of claim 10, wherein the force applying member is a ball bearing biased by a spring.

15. The pneumatic controller of claim 10, wherein the valve includes a valve stem having a reduced diameter portion, the force applying member engaging the reduced diameter portion when the valve is in sealed engagement with the isolation port.

16. The pneumatic controller of claim 15, wherein the valve stem includes a larger diameter portion adjacent to the reduced diameter portion, the force applying member engaging the larger diameter portion when the valve is in sealed engagement with the vent port.

17. The pneumatic controller of claim 10, further comprising:
    a third chamber located within the valve body; and
    a fourth chamber located within the valve body, the fourth chamber being segregated from the third chamber by a sensor diaphragm and being selectively coupled by a second valve to the first chamber to provide atmospheric pressure to the first chamber upon increased pressure in the third chamber.

18. The pneumatic controller of claim 17, wherein the third chamber is coupled to a sensor port configured to receive and communicate increased pressure to the third chamber.

* * * * *